United States Patent
Manilla (10) Patent No.: US 10,664,938 B2
(45) Date of Patent: May 26, 2020

(54) SECURE ELECTRONIC MONEY RESERVE, ACCOUNTING, AND FUNDS TRANSFER SYSTEM FACILITATING FUNDS AND INFORMATION TRANSFER BETWEEN A SERVICE PROVIDER, AT LEAST ONE SERVICE ESTABLISHMENT, AND AT LEAST ONE CUSTOMER

(71) Applicant: Marcellino Manilla, Pittsburgh, PA (US)

(72) Inventor: Marcellino Manilla, Pittsburgh, PA (US)

(*) Notice: Subject to any disclaimer, the term of this patent is extended or adjusted under 35 U.S.C. 154(b) by 0 days.

(21) Appl. No.: 15/860,237

(22) Filed: Jan. 2, 2018

(65) Prior Publication Data

US 2018/0130162 A1    May 10, 2018

Related U.S. Application Data

(63) Continuation-in-part of application No. 15/639,706, filed on Jun. 30, 2017, now abandoned.

(60) Provisional application No. 62/393,313, filed on Sep. 12, 2016, provisional application No. 62/357,086, filed on Jun. 30, 2016.

(51) Int. Cl.
```
G06Q 40/00    (2012.01)
G06Q 50/34    (2012.01)
G06Q 20/40    (2012.01)
G06Q 20/04    (2012.01)
G06F 21/32    (2013.01)
G06Q 20/38    (2012.01)
G06Q 20/32    (2012.01)
```

(52) U.S. Cl.
CPC ............ *G06Q 50/34* (2013.01); *G06F 21/32* (2013.01); *G06Q 20/045* (2013.01); *G06Q 20/381* (2013.01); *G06Q 20/4014* (2013.01); *G06Q 20/3276* (2013.01)

(58) Field of Classification Search
CPC ...................................... G06Q 50/34
USPC ........................................... 705/35
See application file for complete search history.

(56) References Cited

U.S. PATENT DOCUMENTS

2008/0076505 A1* 3/2008 Nguyen .............. G07F 17/32
                                                    463/16
2015/0243133 A1* 8/2015 Nicholas .......... G07F 17/3244
                                                    463/25

OTHER PUBLICATIONS

US Fed News Service, Including US state News; "US Patent Issued to IGT on Jan. 11 for Gaming Apparatus with an Optical Wireless System", Washington D.C. (Year: 2011).*

* cited by examiner

*Primary Examiner* — Edward Chang
(74) *Attorney, Agent, or Firm* — Law Offices of Artoush Ohanian; H. Artoush Ohanian

(57) ABSTRACT

A secure electronic money reserve, accounting, and funds transfer system facilitating funds and information transfer between a service provider, at least one service establishment, and at least one customer.

8 Claims, 3 Drawing Sheets

SECURE ELECTRONIC MONEY RESERVE, ACCOUNTING, AND FUNDS TRANSFER SYSTEM FACILITATING FUNDS AND INFORMATION TRANSFER BETWEEN A SERVICE PROVIDER, AT LEAST ONE SERVICE ESTABLISHMENT, AND AT LEAST ONE CUSTOMER

CROSS-REFERENCE TO RELATED APPLICATIONS

This Application is a continuation-in-part of application Ser. No. 15/639,706 filed on Jun. 30, 2017 and claims the benefits of and priority to that application. Application Ser. No. 15/639,706 is incorporated herein in its entirety by this reference. Application Ser. No. 15/639,706 claims the benefit of, U.S. Provisional Patent Application No. 62/393,313, filed on Sep. 12, 2016, and U.S. Provisional Patent Application No. 62/357,086, filed Jun. 30, 2016. The content of all prior applications is incorporated by reference in their entirety.

FIELD OF INVENTION

The invention is in the field of a secure private virtual money exchange, financial transfer, communication, real time transactions and authorizations, and administration platform and system, more specifically a virtual and physical connection system and method between a Service Provider, Service Establishment(s), and Customer(s).

SUMMARY OF INVENTION

A secure electronic money reserve, accounting, and funds transfer system facilitating funds and information transfer between a service provider, at least one service establishment, and at least one customer.

in at least one current embodiment the system and method can have one or more centralized service provider(s) managing casino patrons' portfolios utilizing proprietary software, a managed master account for transferring moneys between multiple casino accounts and money balances.

In at least one current embodiment the system and method currently known as "Chip-Up" comprises the facilitating of the transfer of money between establishments and end users, while enhancing the social experience and optimizing the gaming atmosphere. Marketing Slogan currently being used: "Chip-Up is facilitating the transfer of money between establishments and end users, while enhancing the social experience and optimizing the gaming atmosphere."

Your money, your friends, your gaming experience (Own the Moment)

IN AT LEAST ONE CURRENT EMBODIMENT THE SYSTEM AND METHOD CURRENTLY KNOWN AS "Chip-Up" and the associated App for among other things providing a secure private money transfer platform for a Customer utilizing unique identifiers created by the said software in response to any transaction requested, such as unique transfer identifier, IN AT LEAST ONE CURRENT EMBODIMENT THE SYSTEM AND METHOD CURRENTLY KNOWN AS "Chip-Up" the invention is among other things a private secure club and casino money and exchange platform.

The invention is a secure electronic money reserve, accounting, and funds transfer system and method facilitating funds and information transfer between a Service Provider, at least one Service Establishment, and at least one Customer comprising: A) at least one Service Establishment acquiring and running in at least one Administration Smart Device an Administration Application that virtually or in combination and coordination with physical steps provides services, exchanges currencies, allows at least one Customer to access at least one User Account, allows at least one Customer to transfer and/or convert funds into Chips (or credit) and to convert said Chips (or said credit) into funds or funds contained in at least one Primary User Account, provide at least one electronic, stored or savable and/or printable receipt and/or report for at least one Transaction by performing in no particular order: downloading and/or installing said Administrative Application received from Service Provider or website or application, an app store, or other designated location and/or other location in communication with said Service Provider website or application; or downloading and/or installing the said Administrative Application from said Service Provider website or application, an app store, or other designated location and/or other location in communication with said Service Provider website or application AND initiating the said Administrative Application; or initiating the said Administrative Application. Registering and/or Sign-in to the said Administrative Application comprising at least one of the following steps: a) filling in at least one user profile data field and/or establishing a password and/or entering at least one biometric data; wherein said at least one user profile data field if present contains in whole or in part at least one of: e-mail address, phone number, at least one name, at least one address, at least one user name, at least one other sign-in request or requirement with or without auto fill and/or add to at least one menu (drop down or other), questions and answers; b) Sign-in by entering the said at least one user profile data field and/or said password and/or said at least one biometric data or c) accessing Administration Application upon initiation with no Sign-in required. Creating and/or acquiring and/or printing at least one of the following: at least one set of instructions, manuals, tutorials, provide terms and conditions, and/or guidance in the operation of said Administration Application and proper usage of said Administration Smart Device to be utilized in specific ways; Setting up, managing, administering at least one User Account; Entering or crediting from at least one Funds Source to at least one Primary User Account; Retrieving money from at least one Primary User Account; Converting retrieved said money to cash and/or Chips; Converting Chips into money that can directly credit at least one Primary User Account; and/or be used to convert said Chips into funds or currency. Linking at least one Primary User Account with at least one other Primary User Account. Performing at least one Customer-authentication and/or verification in real time and Customer-initiated Transaction, instant verification real time. Presenting and/or making available for viewing and/or display on at least one Customer Smart Device at least one Item by at least one Entity. Enabling the purchase or use of at least one Item by at least one Customer, confirming said at least one Primary User Account has sufficient funds to purchase at least one Item, providing confirmation in at least one form to said at least one Customer, and transferring funds from said at least one Primary User Account to at least one other Account and/or at least one Account of at least one Service Establishment; updating at least one Customer initiated Transaction in at least one Primary User Account which may include applying accrued discounts and/or inducements or specials or credit to said at least one Primary User Account which may or may not be Customer specific; fulfilling at least one Customer purchase of at least one Item by delivering and/or making available to said at least one Customer at least one Item; enabling at least one Service Establishment to send at least one invitation to at least one Potential Customer using said Service Establishment Application to increase sales, volume, and popularity; the ability to offer through the Service Provider special discounts, promotions, offers, inducement, specials, and rewards to at least one Customer, and can be created, disseminated, and received in real time; sharing between at least one Entity and at least one other Entity information about Events and/or the ability by at least one Entity to create at least one Event; enabling at least one Service Establishment to offer at least one inducement to at least one Customer to get said Customer to send at least one invitation to at least one Potential Customer using said Customer Application to increase sales, volume, and popularity; track the location of at least one Customer and/or Potential Customer and display on at least one map being displayed on at least one Service Establishment Smart Device; uploading data and/or at least one lists; generating at least one Report; deleting and/or modifying at least one data from at least one database; at least one Customer acquiring and running in at least one Customer Smart Device a Customer Application enabling at least one Customer to perform the following in no particular order: Manually entering the URL of and/or going to the Service Provider website or application or Approved Source or taking at least one photograph and/or scan of at least one code and/or QR code and using resident recognition software on the said Customer Smart Device to recognize and/or read said at least one code and/or QR code to direct the Customer to the Service Provider website or application or other Approved Source where the Customer Application is available to do at least one of the following: downloading and/or installing a Customer Application from the Service Provider website or application, an app store, iStore, or other designated location and/or other location in communication with said Service Provider website or application, an app store, iStore, or other designated location and/or other location in communication with said Service Provider website or application; or downloading and/or installing the said Customer Application from the Service Provider website or application, an app store, iStore, or other designated location and/or other location in communication with said Service Provider website or application, an app store, iStore, or other designated location and/or other location in communication with said Service Provider website or application AND initiating said Customer Application; or initiating said Customer Application; Registering and/or Sign-in to the said Customer Application comprising at least one of the following steps: a) creating a Primary User Account by filling in at least one user profile data field and/or establishing a password and/or entering at least one biometric data; wherein said at least one user profile data field if present contains in whole or in part at least one of: last name, first name, e-mail address, phone number, at least one name, at least one address, at least one user name, at least one other sign-in request or requirement with or without auto fill and/or add to at least one menu (drop down or other); b) providing terms and conditions; c) Sign-in by entering the said at least one user profile data field and/or said password and/or said at least one biometric data; or d) accessing Customer Application features upon said initiating said Customer Application with no Sign-in required; or e) creating a Primary User Account by opening the Customer Application and doing the following: i) entering requested information required which includes at least one of: last name, first name, phone number, e-mail address, at least one account number and/or routing number; ii) after prompting selecting either said phone number and/or text or said e-mail address and/or other unique information and/or identifier to verify the account; iii) receiving a confirmation text and/or e-mail (with a link and/or code to validate the Customer); iv) clicking said link and/or code to create a Primary User Account; v) the Customer Application is activated for the Customer, thus enabling at least one of the following Customer Application features to be available in no particular order: enabling funds transfer from at least one Source to at least one Destination; Depositing money from at least one Funds Source to at least one Primary User Account and/or User Account; Retrieving money from at least one Primary User Account and/or User Account; Converting retrieved said money to cash and/or Chips; Converting Chips into money that can directly credit at least one Primary User Account and/or User Account; Linking at least one Primary User Account and/or User Account with at least one other Primary User Account and/or other User Account; Performing at least one Customer-authentication and/or verification in real time and Customer-initiated Transaction; Presenting and/or displaying on at least one Customer Smart Device at least one Item by at least one Entity; Enabling the purchase of at least one Item by at least one Customer, confirming said at least one Primary User Account and/or User Account has sufficient funds to purchase at least one Item, receiving confirmation in at least one form to said at least one Customer, and transferring funds from said at least one Primary User Account and/or User Account to at least one other Account and/or at least one Account of at least one Service Establishment; updating at least one Customer initiated Transaction in at least one Primary User Account and/or User Account which may include applying accrued discounts and/or inducements or specials or credit to said at least one Primary User Account and/or User Account which may or may not be Customer specific; sharing between at least one Entity and at least one other Entity information about Events and/or the ability by at least one Entity to create at least one Event; receiving at least one Item or having at least one Item being made available to said at least one Customer; receiving at least one Report; deleting and/or modifying and/or updating at least one data from at least one database; track the location of at least one Customer and/or Potential Customer and/or person and display on at least one map being displayed on at least one Customer Smart Device and/or Service Establishment Smart Device and/or Service Provider Smart Device; provide the ability to send at least one message and/or information to at least one Customer and/or person; provide the ability to receive at least one message and/or information from at least one Customer and/or person; the ability to receive from the Service Establishment through the Service Provider special discounts, promotions, offers, inducement, specials, and rewards to at least one Customer, and can be created, disseminated, and received in real time enabling at least on Customer to send at least one invitation to at least one Potential Customer using said Customer Application to increase sales, volume, and popularity.

The invention includes a Service Provider running a Service Provider Application in at least one dedicated specific Service Provider Smart Device that enables the management of at least one Primary User Account and coordination of the activities and/or communication and/or sharing of information between at least one Customer and at least one Service Establishment by performing following in no particular order: maintaining at least Service Provider website or application and/or at least one other application; enabling at least one Potential Service Establishment to download at least one Administration Application onto at least one Administration Smart Device and providing terms and conditions, all features and interaction with at least one Potential Service Establishment to enable said at least one Potential Service Establishment to become at least one Service Establishment that can now conduct at least one Transaction with at least one Customer; enabling at least one Potential Customer to download either directly from the Service Provider and/or through at least one Service Establishment and/or Approved Source at least one Customer Application onto at least one Customer Smart Device and providing terms and conditions, all features and interaction with at least one Potential Customer to enable said at least one Potential Customer to become at least one Customer that can now conduct at least one Transaction with at least one Service Establishment; providing virtual and/or physical material to at least one Service Establishment for use by at least one Service Establishment; maintaining and servicing at least one Primary User Account; enabling Funds transfer from at least one Source to at least one Destination; Depositing money from at least one Funds Source to at least one Primary User Account and/or User Account; Tracking the retrieving of money from at least one Primary User Account and/or User Account; Tracking the conversion of retrieved said money to cash and/or Chips; Tracking the conversion of and accounting for Chips conversion into money that can directly credit at least one Primary User Account and/or User Account; Linking at least one Primary User Account and/or User Account with at least one other Primary User Account and/or other User Account; Performing at least one Customer-authentication and/or verification in real time and tracking and/or orchestrating at least one Customer-initiated Transaction, instant verification real time; Tracking the presentation and/or displaying of and/or presenting and/or displaying on at least one Customer Smart Device at least one Item by at least one Entity; Tracking the enabling of or enabling the purchase of at least one Item by at least one Customer, confirming said at least one Primary User Account and/or User Account has sufficient Funds to purchase at least one Item, sending confirmation in at least one form to said at least one Customer, and transferring Funds from said at least one Primary User Account and/or User Account to at least one other Account and/or at least one Account of at least one Service Establishment; updating at least one Customer-initiated Transaction in at least one Primary User Account and/or User Account which may include applying accrued discounts and/or inducements or specials or credit to said at least one Primary User Account and/or User Account which may or may not be Customer specific; managing interactions between at least one Customer and at least one Service Establishment; the ability of the Service Establishment to offer through the Service Provider special discounts, promotions, offers, inducement, specials, and rewards to at least one Customer, and can be created, disseminated, and received in real time; the ability to monitor all rewards offered by at least one Entity; sharing between at least one Entity and at least one other Entity information about Events and/or the ability by at least one Entity to create at least one Event; generating at least one report to at least one Service Establishment and/or Customer; providing support information about at least one Transaction to at least one Service Establishment and/or Customer in real time; providing at least one software update; deleting and/or modifying and/or updating at least one data from at least one database; track the location of at least one Customer and/or Potential Customer and/or person and display on at least one map being displayed on at least one Customer Smart Device; This invention requires a combination of human and machine interaction that renders the claimed invention more complex than what could be done solely by humans but also requires certain steps to be performed only by humans along with machines performing more complex steps than what could be done by humans.

The invention may include the Linking of at least one Primary User Account and/or User Account with at least one other Primary User Account and/or other User Account includes the Linking of at least one Primary User Account and/or User Account with at least one Players Card Account at least one Casino.

The invention may include the service establishment running the Administration Software through a secure private network at Service establishments location(s) and/or offering secure wife or other secure connection or network to Customers for use for the transactions Customer(s) want or need to be secure when using the Customer Application and may also include simultaneously also maintaining separately public access Wi-Fi and gaming for Customer's needs.

1C) The invention of 1B whereby the secure services described are purchased services with revenue stream that can be shared between Service Provider and Service establishment or solely be a stream for one or the other for data plan(s) that patron(s) can purchase and use.

1d) The invention of claim 1 where all transactions, exchanges, and other aspects and functions thereof can be performed in real time including verifications for transactions which are also performed immediately in real time. Everything creating, receiving, and disseminating of information, event information, opening/closing and transacting within accounts, any platform transactions, any information transmitting are all performed in real time. Service Provider and/or Service Establishment(s) and/or Customer(s) may be given their own associated unique identifier codes, all accounts and transactions are given unique identifier codes. Various financial and other transactions or exchanges between Customer portfolio accounts and/or Customer to Customer transfers or exchanges, and/or Service Provider and/or Service Establishment/Patron that can provider for revenue streams and/or percentages for Service Provider and/or Service establishment. The invention may include existing gaming and gaming currency integration or incorporation in whole or in part. Service Establishment may be a casino. Any Customer Account may be an account managed and/or provided for by a casino. The User may be a gambling patron or Customer of at least one casino. Any Transaction between a Source and a Destination may be a two step Transaction comprising a first Transaction from said Source to at least one User Chip-Up Account and a second Transaction from said at least one primary User Account to said Destination. The invention may further be comprised of Billing and Payment via at least one of: Standard Payment and Approval Procedures, or Automated Payment and Approval Procedures through the Service Establishment Application and/or the Service Provider Application and/or the Customer Application software. The invention may further comprise at least one of the following in no particular order: a) social interaction and/or communication between at least one User and at least one other User; financial transactions, transfers, and exchanges (financial and social interaction); locating/tracking; sharing of data and/or information; b) social interaction and/or communication between at least one User and at least one other potential User; sharing of data and/or information; c) social interaction and/or communication between at least one User and at least one person on at least one list and/or address book; locating/tracking; sharing of data and/or information; d) social interaction and/or communication between at least one User and at least one Service Establishment; sharing of data and/or information; 1) User gets credit (can open accounts and transfer in real time from smart devise at any location) 2) Establishment—builds customer loyalty—can directly market to users, clients, customers, gamblers, and this can be in real time and/or while gaming; e) social interaction and/or communication between at least one User and the Service Provider; sharing and exchanging of data and/or information; User is a User of Service Provider software and Service Provider manages transactions performed by User within the software platform.

The invention may include any of the following: socialization, peer-to-peer communication, recreation, product awareness, brand awareness, business opportunities, with location or real time location analysis via dissemination of content. Users, and/or Service Establishment, and/or Service Provider can notify others in real time via geographical location or query based about events (meetings, social gatherings, concerts, comedy shows, magic shows, or a theatrical performance), marketing (discounts, offers, product sales, advertisements from outside vendors), personal information and things of interest. Queries can be made or responded to for searching for people, places, or things of interest.

Said at least one Account is at least one of at least one bank account in at least one bank, at least one brokerage account in at least one brokerage firm, at least one account in at least one money transfer and/or payment service, at least one account in at least one credit and/or debit card company, at least one account for at least one Entity in at least one casino, at least one business account, at least one User Account or Primary User Account for at least one Customer.

One current embodiment has the following key features:
The Step-by-Step Process of a Verifying a Chip-Up transfer of funds)
(from a Service Establishment (Casino)prospective
(they have already set up an administrative service establishment version of Chip-Up)
1) the appropriate service establishment representative (pit-boss) is notified that a Chip-Up (transfer of funds) has been completed at one of their gaming tables
  a) they grab their appropriate smart device (iPhone, iPad, Android Device)
2) the representative walks to the appropriate table
  a) asks to see the user's verification screen, displaying their barcode (or other form of verification)
3) using their smart device scan (verifying) feature that is built into the service establishment version of the Chip-Up Software application
  a) they scan or verify the uniquely generated barcode (biometric) at the bottom of the user's smart device.
ONCE THE BARCODE or FINGERPRINT IS SCANNED . . .
At the top: The user's profile picture will be displayed for additional security measures.
In the middle: The transaction will be detailed.
At the bottom: APPROVE button for the representative to move the money into the service establishment's chip-up account.
4) Once the transaction is complete
  a) the representative will have the option to print a receipt to drop into the drop box
  b) no receipt is needed, and everything is documented digitally in the reports section of the administrative app Example of completed chip-up (transfer of funds) on smart device screen:
Name: Cora Garner (Picture of Cora also appears in at least one embodiment)
Chip-Up Acct No: 123456789
M-Life Acct No: 25560965
Cora Garner successfully completed a chip-up (transfer of funds) of $500
to MGM Grand Las Vegas from Chase XXXX-XX-3049
In at least one embodiment—Screen shows "APPROVE" with checkmark The Step-by-Step Process of a User Completing a Chip-Up (transfer of funds) from a user prospective
(they have already set up a funding source and fully completed the sign up)
5) for example if the user decides to do a $500 transfer of funds
  b) they can click the drop-down menu for prepopulated amounts
  c) and/or type in the desired amount
6) the user needs to decide which service establishment (casino) to send the desired chip-up (transfer of funds) amount
  b) they can click the drop-down menu for prepopulated participating service establishments (casinos) based on geo-location
  c) or the user can type in the desired service establishment (casino) if location services are not working
7) the user verifies information and clicks CHIP-UP (transfer of funds)
  a) confirmation—pass code, possibly a touch id verification
ON THE NEXT SCREEN . . . .
At the top: The chip-up (transfer of funds) amount will be displayed stating it was sent to the desired service establishment (casino)
In the middle: A checkmark will be displayed to show the transaction has been complete.
At the bottom: A scannable QR and/or bar code (or some form of verification) will be displayed that contains certain security biometrics such as but not limited to unique transaction identification number, their user profile picture, their user id number, their loyalty or players card number, and the approved chip-up amount from the funding source (last 4 of account will be displayed)
4) From this point, they need to ask the dealer of their desired gaming table to alert the pit boss (or appropriate supervising figure) that they just completed a CHIP-UP (transfer of funds)
A VERY SIMPLE EXAMPLE SCREEN SHOT OF A TRANSACTION ON THE NEXT PAGE
Example of completed chip-up (transfer of funds) on smart device screen:
Cora Garner completed a $500 USD Chip-Up (transfer of funds)
to MGM Grand LAS VEGAS
In at least one embodiment screen shows a big checkmark and bar code Although preferred embodiments of the present invention have been described it will be understood by those skilled in the art that the present invention should not be limited to the described preferred embodiments. Rather, various changes and modifications can be made within the spirit and scope of the present invention.

KEY FEATURES AND BENEFITS

IN AT LEAST ONE CURRENT EMBODIMENT THE SYSTEM AND METHOD [CURRENTLY KNOWN AS "Chip-Up"] comprises the facilitating of the transfer of money between establishments and end users, while enhancing the social experience and optimizing the gaming atmosphere.

Marketing Slogan currently being used: "Chip-Up is facilitating the transfer of money between establishments and end users, while enhancing the social experience and optimizing the gaming atmosphere."

Your money, your friends, your gaming experience (Own the Moment)

| Player Benefits | Casino Benefits |
| --- | --- |
| Convenience/Ease of Use | Player Retention |
| Increased Security | Seamless Integration (No Hardware) |
| Socialization (to a non-social industry) | Additional Revenue Stream(s) |
| Reinforces Responsible Gaming (i.e. - Ability to set Daily Limits) | Capturing Unattainable Players (Generation who doesn't carry cash) |
| Does not have to handle cash | Detailed Reporting (access to more data) |
| Ability to easily transition between properties | Reduce Risk |
| Ability to loan and/or transfer money to other Chip-Up users (friends) (Peer to Peer) | Ability to Promote and Market within Chip-Up (access to emails, home addresses, etc.) |
| Ability to enable location services (see where your friends are gaming) | Ability to Link Player Gaming Cards to Chip-Up account |
| Eliminates the need for multiple lines of credit(s) with different properties | Everything is Virtual (with the ability to create a paper trail) |
| No credit checks | Does not have to involve credit dept (customers are using their own funding source) |
| | Builds Customer Loyalty |

Strategic Points

1. The Customer(s) has the ability to share via one way or two way or three way or multiple way communication information with at least one other Customer and/or at least one Service Establishment and/or the Service Provider, and further that at least one Service Establishment can communicate in at least a one way communication with at least one other Service Establishment and/or at least one other Customer and/or the Service Provider, and further that the Service Provider can communicate in at least a one way communication with at least one Service Establishment and/or at least one Customer.

2. The creation of, receiving, and dissemination of information about events in real time to and/or from others who are Registered Users and/or Others.

3. Invitations from Customer(s) to new potential Customers through the Customer Application to increase sales and volume, and popularity.

Figure 1:
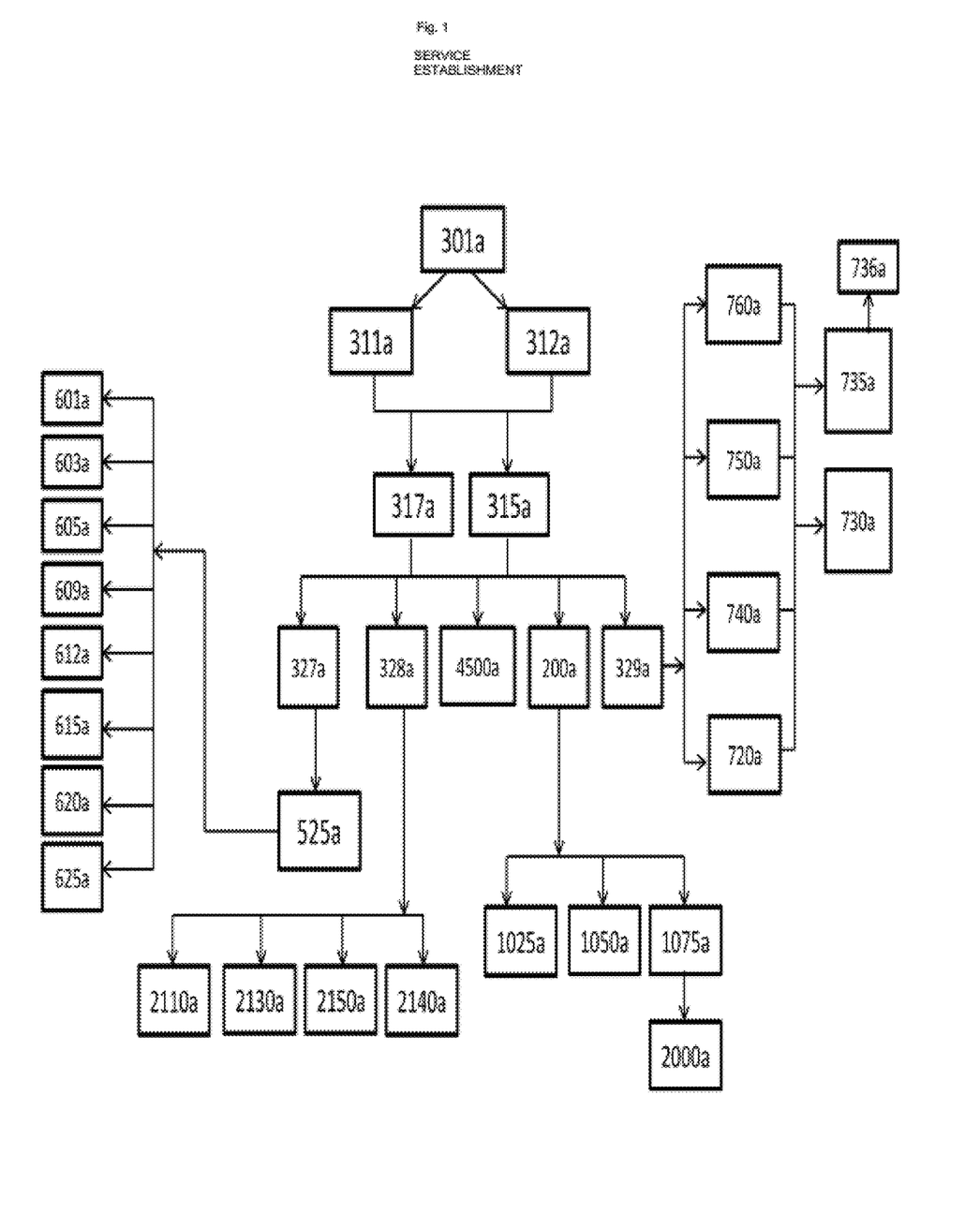
FIG. 1 is a flowchart depicting at least one Service Establishment's interaction with the Service Provider and at least one Customer.
Figure 2:
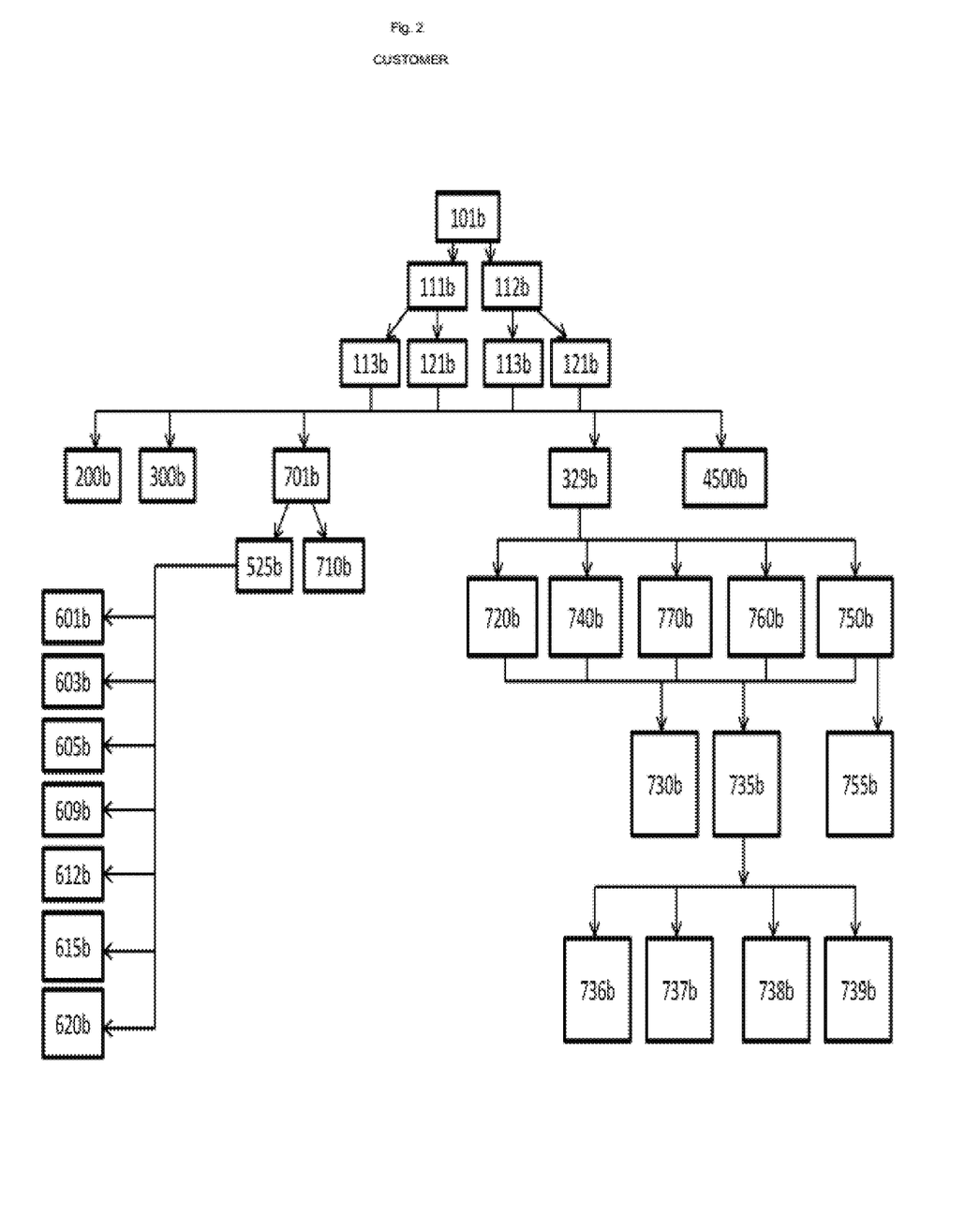
FIG. 2 is a flowchart depicting a Customer's Interaction with the Service Provider and at least one Service Establishment.
Figure 3:
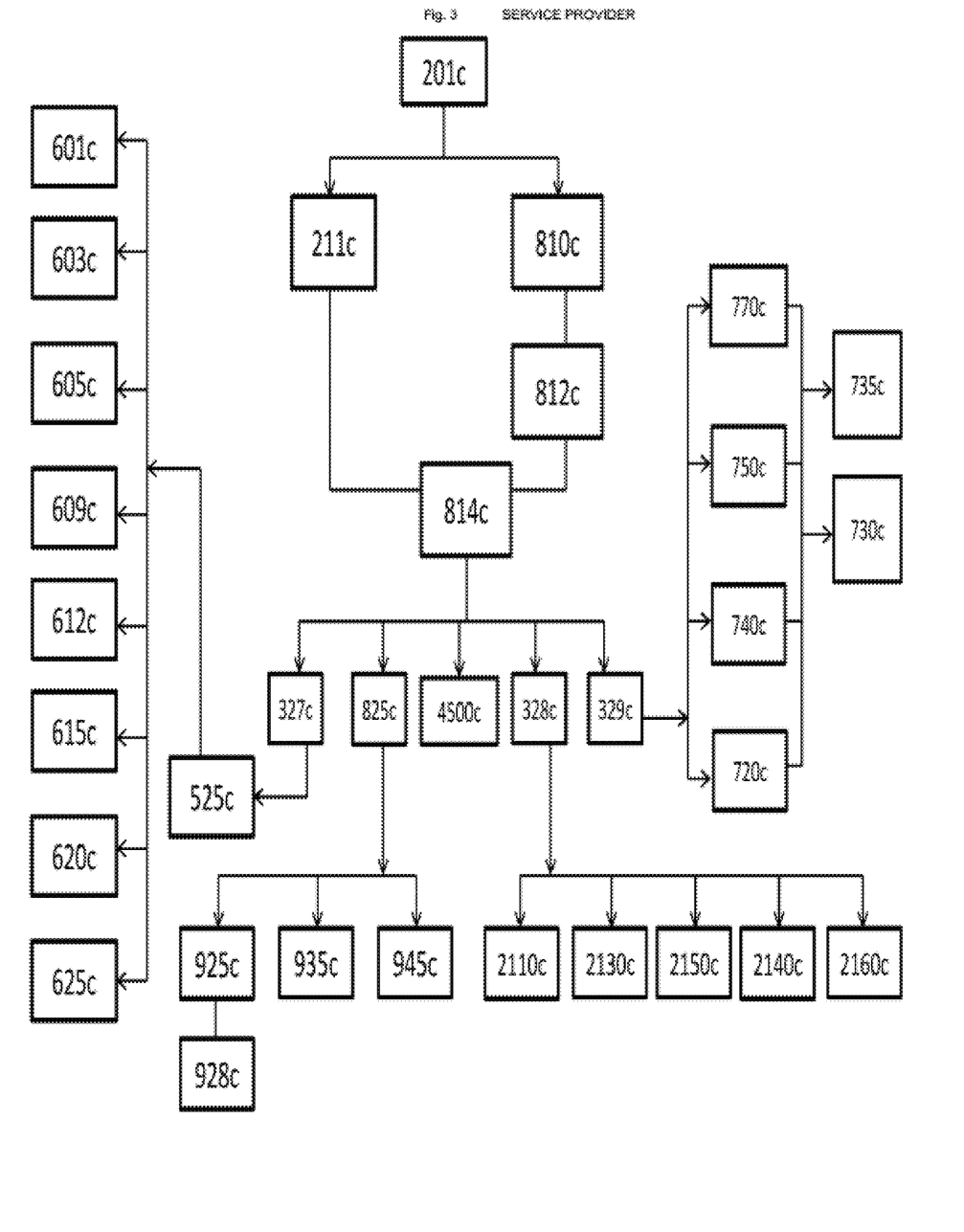
FIG. 3 is a flowchart depicting the Service Provider's interaction with at least one Customer and at least one Service Establishment.

Flowchart Key Number and Components list for FIGS. 1 to 3:

Chip-Up Service Establishment (Flowchart 1)
200a—Chip-Up Service Provider (licensor)
301a—Chip-Up Administration Application
311a—download and/or install the Administration Application AND initiate Administration Application
312a—initiate Administration Application
315a—Service Establishment Registering and/or Sing-in to the Administrative Application:
317a—Sing-in by entering at least one user profile data field and/or password
327a—Customer management
328a—Internal affairs
329a—Social communication
525a—Customer Chip Up accounts with this establishment
601a—Open new customer chip up account(s) to link to provider or master Chip-Up account and could link to other accounts provided by the establishment
603a—Management of customer Chip-Up accounts just specific to establishment in association with provider and provider links
605a—Transferring of money from customer accounts within establishment—Chip-Up, non-Chip-Up, to provider or master Chip-Up
609a—Authenticating
612a—Converting money to Chips, hard cash, or other establishment currency, or converting Chips to money or back in an account
615a—Transfer funds inter customer and intra customer
620a—Customer marketing
625a—Linking player's cards to Chip Up accounts
720a—Social interaction between existing users plus whatever is required of establishment to facilitate same
730a—whatever is required of establishment to facilitate same Locating and tracking
735a—whatever is required of establishment to facilitate same Sharing of information
736a—whatever is required of establishment to facilitate same Sharing with customer rewards, events, etc.
740a—whatever is required of establishment to facilitate same Communication with potential users plus same as 720a add
750a—whatever is required of establishment to facilitate same Registered user communicating with someone from their friend's list plus same add as above
760a—Communication between user and service establishment
1025a—contracts with service provider-agreements with the establishment for Chip-Up software, service provider services, etc
1050a—reports and other communication from service provider
1075a—reports, other communication to service provider
2000a—
2110a—internal reports
2130a—billing to customers
2140a—other billing
2150a—billing from provider
4500a—outside platform affairs (venmo, PayPal, etc.)
Chip-Up Customer (Flowchart 2)
101b—Chip-Up Customer Application
111b—Download and/or install the Customer Application AND initiate Customer Application 112*b*—Initiate Customer Application
113*b*—Customer Registration with and/or Sign-in to the Customer Application
121*b*—Sign-in by entering the said at least one user profile data field and/or password
200*b*—Chip Up service provider
300*b*—Chip Up Service Establishment
329*b*—Social communication
525*b*—My accounts
601*b*—Open chip up accounts—master and sub
603*b*—My management of my accounts (Customer)
605*b*—Transferring money—to and from accounts, establishments, into or from physical currency, chips, etc
609*b*—Authenticating
612*b*—Converting money to Chips, hard cash, or other establishment currency or converting Chips to money
615*b*—Transfer funds inter customer
620*b*—Customer marketing
701*b*—Account management
710*b*—Creating and managing social media communication accounts not financial
720*b*—Social interaction between existing users
730*b*—Locating and tracking
735*b*—Sharing of information
736*b*—delete
737*b*—delete
738*b*—delete
739*b*—delete
740*b*—Communication with potential user's plus
750*b*—Registered user communicating with someone from their friend's list plus
755*b*—Create, add to, manage. delete from, Chip Up friends list
760*b*—Communication between user and service establishment
770*b*—Communication between user and service provider
4500*b*—outside platform affairs (venmo, PayPal, etc.)
Chip-Up Service Provider (Flowchart 3)
201*c*—Chip Up Service Provider Application
211*c*—Maintains at least one website and/or at least one Service Provider Application and/or at least one other application
327*c*—Customer management
328*c*—Internal affairs
329*c*—Social communication
525*c*—Customer accounts
601*c*—Management, service, linking, provide for customer opening accounts—master and sub
603*c*—Management of all customer chip-up accounts, links, platforms, etc.
605*c*—Managing all transfers of money through platform
609*c*—Authenticating
612*c*—Converting money to Chips, hard cash, or other currency, or converting Chips to money or other currency
615*c*—Transfer funds inter customer
620*c*—Customer marketing
625*c*—link player's cards to chip up accounts
720*c*—Social interaction between existing users plus whatever provide must provide to facilitate same
730*c*—Locating and tracking plus same add
735*c*—Sharing of information plus same add
740*c*—Communication with potential users plus same as 720*c* add
750*c*—Registered user communicating with someone from their friend's list plus same add as above
770*c*—Communication between user and service provider
810*c*—Maintain at least one application on a smart device
812*c*—Initiate app
814*c*—Sign in
825*c*—Service establishment management
925*c*—Set up for new establishments
928*c*—Agreements with establishments for Chip-Up software, service provider services, etc
935*c*—Management of existing establishments
945*c*—Reports and other communication for existing establishments
2110*c*—internal reports
2130*c*—billing to customers
2150*c*—billing to establishments
2140*c*—other billing
2160*c*—platform provider billing from or two
4500*c*—Outside platform affairs (venmo, PayPal, etc.)

DETAILED DESCRIPTIONS OF DRAWINGS

FIG. 1 is a flowchart depicting at least one Service Establishment's interaction with the Service Provider and at least one Customer.

FIG. 2 is a flowchart depicting a Customer's Interaction with the Service Provider and at least one Service Establishment.

FIG. 3 is a flowchart depicting the Service Provider's interaction with at least one Customer and at least one Service Establishment.

Definitions

ONE CURRENT EMBODIMENT OF THIS INVENTION IS CURRENTLY KNOWN AS "Chip-Up", and the name "Chip-Up" can be changed at any time in any embodiment and this name is not itself part of the invention, to clarify "Chip-Up" is the current title being used in at least one embodiment but can be changed, altered, or modified at any time.

Chip-Up: As used throughout the specification, claims, abstract, drawings herein as part of certain terms described or used herein and usually the first word of the term (i.e. Chip-Up Account, Chip-Up User Account, Chip-Up Primary User Account) is just there for clarifying purposes and this word does not itself have a meaning or add a meaning other than to signify that it comes from or is provided by the Service Provider or the Service Provider's software, or Service Provider Application, Administrative Application, and/or Customer Application. This word can be changed or modified or removed and the invention, specification, claims, abstract, and/or drawings when being examined for any purpose including but not limited to determining whether any third party is infringing upon this invention should examine two ways: 1) as if the word was not present and 2) examine only that Chip-Up means to signify that it comes from or is provided by the Service Provider or the Service Provider's software, or Service Provider Application, Administrative Application, and/or Customer Application.

Approved Source: is a source approved by the Service Provider to purchase and/or obtain an Administration Application or a Customer Application, and this can be from an iStore, an app store, a direct download from Service Provider's website. (we are adding to this list)

At least one Account: is at least one of at least one bank account in at least one bank, at least one account in at least one money transfer and/or payment service, at least one account in at least one credit and/or debit card company, at least one account in at least one brokerage firm, at least one account for at least one Entity in at least one casino, a Primary User Account and/or Primary Customer Account and/or User Account held and maintained at or by or administered by at least one Service Establishment or the Service Provider, at least one business account, at least one Customer Account and/or Customer Account and/or Primary User Account for at least one Customer. An Account can be managed and/or provided for by an Establishment or Casino.

Authorized Person(s): is at least one person, officer, or responsible individual that can make decisions on behalf of at least one Entity.

Biometric data: can be at least one of including but not limited to at least one finger print, face and/or body image, retinal scan, DNA sample.

Primary User Account also called Primary Customer Account: can be a type of Customer Account managed by the Service Provider that contains the Funds of at least one Customer that can be used for at least one Transaction.

Chip-Up Customer Service Establishment Account: is the Service Establishment User Account in which funds are transferred into or out of to at least one Primary User Account.

Chip-Up Users: can include persons and/or Entities and or at least one Customer.

Customer Account: can be a User's Primary Chip-Up Account or a Customer Account held and/or maintained and/or managed by, and/or administered by at or by at least one Service Establishment and/or casino and/or the Service Provider.

Primary User Account also called Primary Customer Account: can be a type of Customer Account managed by the Service Provider that contains the Funds of at least one Customer that can be used for at least one Transaction.

Customer Service Establishment Account: is the Service Establishment account in which funds are transferred into or out of to at least one Chip-Up Primary User Account.

Users: can include persons and/or Entities and or at least one Customer.

Customer Account: can be a User's Primary Account or a Customer Account held and/or maintained and/or managed by, and/or administered by at or by at least one Service Establishment and/or casino and/or the Service Provider.

Chip or Chips: are classical chips as might be used for gambling in a casino. In the context of this invention Chips can be electronic currency or credit or money or anything of value that can be used for gambling and/or to make purchases with. Money in an account can be converted into Chips and Chips can be converted into money or money in an account.

A Destination: is at least one of at least one account, at least one bank account in at least one bank, at least one brokerage firm, at least one account in at least one money transfer and/or payment service, at least one account in at least one credit and/or debit card company, at least one account for at least one Entity in at least one casino, at least one business account, at least one Customer Account for at least one Customer, at least one chip, cash, a check, anything of value that can be appraised and equated to money, bit coin, or any other accepted currency or useable exchange or transfer item for Chips and vice versa, At least one Entity: can be at least one Customer, at least one User, Service Establishment, casino, Service Provider, business and/or corporation, electronic account, at least one person, government, Funds are at least one of: cash and/or money in any form of currency, an asset, electronic funds, bit coin, bonds convertible at a market or other rate, stocks convertible at a market or other rate, the monetary equivalent of anything or any asset that can be equitable to money that can be transferred from any Source to any Destination.

Funds Source: can be at least one of at least one bank, at least one brokerage firm, at least one account in at least one money transfer and/or payment service, at least one account in at least one credit and/or debit card company, at least one account for at least one Entity in at least one casino, at least one business account, at least one customer account for at least one customer, a bit coin account, at least one other Source, a marker.

An Item: is at least one physical item that can be purchased, rented, leased and/or at least one Service that can be performed or offered by at least one Entity.

A Marker: in the context of this invention is a preapproved value of money and/or currency of any form that can go into at least one Account and/or at least one Customer Account and/or User Account, or the monetary equivalent of anything or any asset that can be equitable to money and/or currency of any form. For instance, if a gambler and/or Customer puts up a diamond ring and an Authorized Person says or agrees or attests that the ring is worth $50,000, then a Marker can be entered the Customer's Account and/or User Account and it will be the same as if a bank or Entity had wired $50,000 of spendable money to the Customer's Account and/or User Account. A Marker can be used for any good or service of appraisable value. For example, a service could be the promise to paint someone's house or perform some other service for an agreed-upon amount of money, and that amount would be a Marker credited to the Customer Account.

Portfolio: can be at least one Account, at least one Customer Account and/or User Account, an Account comprising at least one other Account and/or Customer Account and/or User Account. A Portfolio can be at least one Account comprising a multiplicity of Accounts of a multiplicity of types of financial instruments and/or assets.

Service Establishment: can be at least one casino, restaurant, hotel/lodging, store, mall, place where business can be conducted, or other establishment Social Interaction: is at least one e-mail, communication, even creation, offering and/or inducement. A Social Interaction can be anything information transfer between at least one person or Entity and at least one other person or Entity that is not a Transaction (financial transaction).

A Source: is at least one of at least one account, at least one bank account in at least one bank, at least one brokerage firm, at least one account in at least one money transfer and/or payment service, at least one account in at least one credit and/or debit card company, at least one account for at least one Entity in at least one casino, at least one business account, at least one Customer Account for at least one Customer, at least one chip, cash, a check, anything of value that can be authenticated and appraised and equated to money, bit coin, a Marker, A Transaction: is the movement of money and/or assets from at least one Source to at least one Destination or the purchase of at least one Item for Sale. All Transactions are (or can be) secure and employ Encryption and every practical means to avoid theft and/or misrouting of information and/or funds.

A User: can be any person, any person with access to use the application or that initiates, downloads, utilizes, or runs the application in part or in whole, a potential customer, Customer, a Service Establishment, a commercial establishment, a bank, a brokerage firm, any Entity that can perform business on its own behalf or on behalf of at least one other Entity, an entity.

The User's Primary Account: is a Customer Account held and/or maintained at, managed by, administered by, or through the Service Provider. It is the hub and/or central account through which all transactions must pass and a processing fee can be charged for the Transaction which can be the transfer of funds from a Source into the Primary User Account and/or from the Primary User Account to a Destination. There can be more than one Primary User Account for any one User.

Wallet: is an Account containing Funds.

PayPal is an electronic commerce (e-commerce) company that facilitates payments between parties through online funds transfers. PayPal allows customers to establish an account on its website, which is connected to a user's credit card or checking account.

API: Application program interface (API) is a set of routines, protocols, and tools for building software applications. An API specifies how software components should interact and APIs are used when programming graphical user interface (GUI) components.

Accountable Purchases: are purchases that can contribute toward a reward, upgrade to a more expensive and/or higher quality Item, special, and/or inducement.

ADVERTISEMENT TYPE: can be signage or a print ad, newspaper or magazine or another printed medium. Advertisement Type can contain QR codes and/or bar codes or codes of any form that can be manually entered a smart device or photographed and/or scanned to enable automatic data entry or extraction of at least one URL.

AN APP STORE: is a place where applications can be downloaded and/or purchased and downloaded.

As used herein, the term "and/or," when used in a list of two or more items, means that any one of the listed items can be employed by itself, or any combination of two or more of the listed items can be employed. For example, if a device is described as containing components A, B, and/or C, the composition can contain A alone; B alone; C alone; A and B in combination; A and C in combination; B and C in combination; or A, B, and C in combination.

Automated Payment and Approval Procedures: can be invoked if the payment information of a Customer is already in the records of at least one Service Establishment running an Administration Application. This can speed up the transaction time for both the Customer and the Service Establishment. The Customer may also be eligible for a reward, upgrade to a more expensive and/or higher quality Item for Sale, special, and/or inducement, and the Customer Application may be set to automatically accept such offers.

CODE: is any of the following, a QR code, a bar code, an alpha-numeric string of characters, geometric shapes or other means of representing one of several possible things contained within a set.

CUSTOMER: At least one of Patron, Guest, User, Client.

Customer Account: The account generated for a Customer running the Customer Application on at least one smart device.

This can contain the Item or Items purchased by the Customer and/or Customer history so that discounts, specials, inducements, at least one upgrade of at least one Item, gifts and/or other rewards can be tallied and/or quantified. This can also contain a profile of the Customer so that offers of at least one Item for sale can be customized for that specific Customer. This can be a dynamic file containing information on any number of subjects related to the Customer.

CUSTOMER APPLICATION: is the application that runs on at least one smart device, and the Customer Application is provided by a Service Provider. The Customer Application handles all one and at least two-way interactions between the Customer and Service Provider and between the Customer and at least one Service Establishment.

Customer Application Features: are the features available to a Customer after Registering and/or Signing-in. These are the features that enable the Customer to place and receive an order for at least one Item for Sale. This enables communication with other Customers and/or potential Customers, the Service Establishment, and/or the Service Provider.

A DESIGNATED LOCATION: is a location authorized by Service Provider to disseminate an application, and/or updates, of any kind, including but not limited to a Service Establishment's application, a Customer's application, a template.

OTHER LOCATION: is any other smart device in communication with a Service Provider website and/or a Service Provider or with at least one Customer and/or at least one Service Establishment and/or at least one other entity.

OTHERS: A Customer's friends, family, contacts, associates, relationships, and/or acquaintances.

AT LEAST ONE PROGRAM AND/OR UTILITY AND/OR APPLICATION: is the set of software instructions included within the Service Provider Application, the Administration Application, the Customer Application, the operation of at least one Service Provider and/or the Service Provider import and/or export template format, including software upgrades and patches to improve overall system performance and the improvement of the Service Establishment's and/or Customer's experience.

REDIRECTOR: A redirector can be a program or utility that can send the user of a smart device directly to a website and/or a utility resident on at least one smart device. In the context of this invention the redirector is a piece of software that sits on the Cloud server inspecting the inbound messages. Prior to downloading an application, when a user has scanned a code with a generic scanner or reader already resident in the user's smart device, the redirector sends the user and/or Customer and/or Service Establishment to where Service Provider has designated the application to be available to download. The redirector can identify the operating system of the device that took a photograph and/or scan, for instance to determine the difference between IOS from Android.

REGISTER: Sign-up. This can apply to at least one Service Establishment Registering with at least one Administration Application and/or at least one Customer Registering with at least one Customer Application.

REGISTERED USERS: Those users that are registered users of the same application.

REPORT: A report is a Customer's report, support information for the Service Establishment, statistical sales or industry and/or competitor data, historical sales information, sales projections, comparisons between at least two Service Establishments, demographic information on at least one Customer, best current practices and/or sales techniques, financing strategies. This includes real time data capture that is transmitted and received, none of which can be performed by humans alone.

SERVICE ESTABLISHMENT: is a location or point of sale where customers can buy drinks, food, condiments, gifts, collectibles, art, photographs, products, toys, or at least one item. The point of sale location can be establishments such as including but not limited to a Casino, Bar, Restaurant, Bar/Restaurant, catering hall, cafeteria, club, coffee house, store, concession stand, portable cart, airplane, boat, a retail establishment selling items to the public or other businesses, shop, (retail) outlet, boutique, department store, general store, chain store, emporium, food court.

SERVICE ESTABLISHMENT APPLICATION: is the application that runs on at least one smart device. The Service Establishment's Application is provided by a Service Provider. The Service Establishments Application handles all one and at least two-way interactions between the Service Establishment and Service Provider and/or between the Service Establishment and at least one Customer. The Service Establishment Application includes all formatted templates in which data can be entered and/or displayed.

SERVICE PROVIDER:

Service Provider designated location is a website and/or application or service or location authorized by the Service Provider to serve as a source of any Customer Application, Administrative Application, and/or at least one template, and/or at least one update.

SERVICE PROVIDER WEB SITE AND/OR APP: is at least one website and/or app maintained by a Service Provider that communicates with at least one Customer and/or at least one Service Establishment and/or at least one other entity.

SIGNAGE: a sign that attracts the attention of Customers or potential customers. Signage can be printed on a home or office printer or professionally printed and/or molded and/or stamped into a surface for subsequent display.

SIGN-IN/LOG-IN: Sign-in and Log-in are used interchangeably and is when a Customer running the Customer Application signs into the Customer Application and/or the Service Establishment running the Service Establishment Application Signs-in to the Service Establishment Application, both of which may or may not be in communication with the Service Provider and/or the Service Provider website and/or the Service Provider's designated location.

SMART DEVICE: In the context of this invention a smart device is a mobile phone and/or what is commonly referred to as a smart phone such as including but not limited to an iPhone or an Android, a laptop computer, a desktop computer, a mainframe computer, a tablet, a reader, a projection device and/or system.

The smart device can further be or comprise of at least one of at least one camera, RFID, GPS circuitry, at least one communication receiver device and/or the at least one communication transmitter device and/or the at least one communication transmitter/receiver device employing at least one of Wi-Fi, radio wave and/or electromagnetic radiation, and/or Bluetooth.

A smart device can be a multiplicity of smart devices, and reference to a smart device can be several smart devices, wherein one smart device can talk either directly to the internet (and subsequently directly to the Service Provider and/or the Service Provider's website) or to at least one other smart device that in turn communicates to the internet.

There can be any number of smart devices in the chain, forming serial and parallel paths for information to flow in one or two directions, and all the smart devices are individually and collectively referred to as the "smart device".

A smart device can comprise in whole or in part of the following components listed in no order:
at least one microprocessor possessing at least one core;
at least one memory;
at least one display;
at least one means to input data;
wherein said at least one means to input data is at least one of at least one camera, a touch screen, a keyboard, at least one form of wireless communication, at least one form of communication via at least one fiber optic cable, at least one form of communication via at least one wire connected to at least one mechanical connector with at least one electrical contact;
at least one transceiver configured to communicate with at least one other smart device and/or with a server and/or a network capable of connecting to the internet;
said components programmed to do the following:
sending at least one formatted list to at least one data base and/or master data base resident in at least one physical location;
receiving at least one e-mail and/or downloading tracking information and/or at least one report from the Service Provider and/or the Service Provider's website or other designated location and/or at least one other location in communication with the Service Provider and/or the Service Provider's website;
generating at least Report.

Standard Payment and Approval Procedures: This can be either paying with cash or a credit card or debit card. With any form of card there would be a confirmation that the card is valid and that the purchase can be covered by the card-issuer.

Uploading data and/or LIST(s):

URL: Short for Uniform Resource Locator, which is an internet address. Manually entering a URL or clicking on a link that automatically enters the URL can bring a user, or in the context of the invention, a Customer and/or a Service Establishment, directly to the Service Provider and/or the Service Provider web site.

What is claimed:

1. A system for location-based secure electronic monetary reserve and funds transfer system, the system comprising:
a personal gaming administration module stored in computer memory on a mobile communication device, the personal gaming administration module providing data communications with a financial institution to provide location-based secure electronic monetary reserve and funds transfer, and wherein the personal gaming administration module provides an interface for providing financial information prior to the user's gaming with a gaming provider; and wherein the personal gaming administration module stores gamer financial information to administer financial interaction with a gaming provider module operating by a gaming provider;
a gaming provider module operating on a gaming server, wherein the gaming provider module operating on the gaming server includes computer memory configured to:
receive from the personal gaming admiration module a request for one or more gaming units, wherein the request for gaming units includes at least some portion of the financial information and a request for a number of gaming units, and wherein the gaming units are based upon location-based secure monetary reserve and funds transfer;
wherein the gaming units based upon location-based secure monetary reserve and funds transfer are location-based in dependence upon the current location of the personal gaming administration module stored in computer memory on a mobile communication device;

determine, by the gaming provider module in dependence upon one or more gaming provider rules, whether to provide the gaming units based upon the financial information including at least location-based secure monetary reserve, the value of the gaming units, and the number of gaming units requested; and provide or deny the gaming units, through the gaming provider module and the personal gaming administration module in response to the request including providing a notification through the gaming provider module and the personal gaming administration module with an acceptance message indicating that the gaming units have been granted or a denial message indicating that the gamin units have been denied; and wherein the gaming units are provided outside and un-coupled with a digital game of chance.

2. The system of claim 1 wherein a gaming provider module operating on a gaming server, wherein the gaming provider module operating on the gaming server includes computer memory configured to present through the personal gaming administration module on the mobile communication device in response to the financial information provided through the interface for providing financial information a financial certification indicating a financial value available to a gaming provider to evaluate purchasing gaming units.

3. The system of claim 1 wherein the personal gaming administration module stored in computer memory on the mobile communication device is configure to provide a notification through the gaming provider module includes providing a notification at the gaming location.

4. The system of claim 1 wherein the personal gaming administration module and the gaming provider module are coupled for data communications through a secure network provided by the gaming provider.

5. The system of claim 1 wherein providing or denying the gaming units includes providing a notification in real time.

6. The system of claim 1 wherein said gaming provider is a casino.

7. The system of claim 1 wherein the gaming units are provided outside and un-coupled with a digital game of chance and for use in non-digital games of chance.

8. The system of claim 7 wherein the non-digital games of chance includes table games.

\* \* \* \* \*